United States Patent [19]

Benefield et al.

[11] Patent Number: 4,990,568

[45] Date of Patent: Feb. 5, 1991

[54] THERMOPLASTIC POLYOLEFIN AND ETHYLENE COPOLYMERS WITH OXIDIZED POLYOLEFIN

[75] Inventors: Robert E. Benefield, Zachary; Charles E. Boozer, Baton Rouge, both of La.

[73] Assignee: Copolymer Rubber & Chemical Corporation, Baton Rouge, La.

[21] Appl. No.: 319,954

[22] Filed: Mar. 7, 1989

Related U.S. Application Data

[63] Continuation of Ser. No. 8,633, Jan. 29, 1987, abandoned.

[51] Int. Cl.$^5$ ................ C08L 23/16; C08L 23/12
[52] U.S. Cl. .................................. 525/232; 525/221
[58] Field of Search ............ 525/221, 232, 240; 524/495

[56] References Cited

U.S. PATENT DOCUMENTS

| | | | |
|---|---|---|---|
| 3,222,431 | 12/1965 | Greear | 524/275 |
| 3,256,365 | 6/1966 | Wolinski | 524/277 |
| 3,367,999 | 2/1968 | Steierman | 264/132 |
| 3,373,078 | 6/1968 | Ferington | 428/462 |
| 3,639,189 | 2/1972 | Hartman | 156/334 |
| 3,756,999 | 9/1973 | Stetter | 525/388 |
| 4,436,863 | 3/1984 | Albee, Jr. | 524/451 |
| 4,455,273 | 6/1984 | Harpell | 264/184 |
| 4,584,347 | 4/1986 | Harpell | 525/119 |
| 4,588,775 | 5/1986 | McCullough, Jr. | 525/88 |

FOREIGN PATENT DOCUMENTS

| | | |
|---|---|---|
| 2557228 | 8/1986 | France . |
| 28234 | 8/1981 | Japan . |
| 771126 | 1/1980 | U.S.S.R. . |
| 1059233 | 2/1967 | United Kingdom . |

*Primary Examiner*—Christopher Henderson
*Attorney, Agent, or Firm*—Rockey and Rifkin

[57] ABSTRACT

A polyolefin-EPDM or EPM thermoplastic blend in which the bonded relation of applied organic coatings is improved by the inclusion of an oxidized or carboxylated polyolefin.

17 Claims, No Drawings

THERMOPLASTIC POLYOLEFIN AND ETHYLENE COPOLYMERS WITH OXIDIZED POLYOLEFIN

This is a continuation of co-pending application Ser. No. 008,633 filed on Jan. 29, 1987 now abandoned.

INTRODUCTION

This invention is addressed to the problem of adherence of coatings applied to surfaces of articles formulated of such thermoplastic materials as are referred to in the trade as thermoplastic elastomers (TPE) or thermoplastic olefinic elastomers (TPO), such as EPDM-polypropylene compositions.

BACKGROUND OF THE INVENTION

Many automotive and other articles are molded or otherwise fabricated of thermoplastic compositions which embody about equal parts by weight of (1) an interpolymer of ethylene, one or more $C_3$-$C_{16}$ mono-olefins, preferably propylene and a polyene, preferably 5-ethylidene-2-norbornene, generally referred to in the trade as an EPDM and (2) a thermoplastic polyolefin resin, preferably polypropylene. One of the problems faced by articles molded or otherwise fabricated of such TPO compositions, is the difficulty of achieving strong adherence of coatings applied to the surfaces of such articles, as in the color coating of such articles, especially with a polyurethane based coating composition.

To the present, in order to provide for a desirable adhesion of a paintable coating, it has been the practice to first apply an adhesion promoter, followed by the application of a prime coat, and then the application of the final paintable color coat. The ability to eliminate the promoter as a first coating while achieving strong adherence of the paintable color coating would materially enhance the entire process especially from the standpoint of material cost, processing time and conservation of space, equipment, and labor.

OBJECT OF THE INVENTION

Thus it is an object of this invention to provide a TPO composition of the type described which can be directly paintable (DP-TPO) to provide strong adherence of applied coatings without the need of a first adhesion promoter coating and in which such directly coatable or otherwise paintable article can be achieved by modification of the composition of which the article is formed but without undesirable effect on the physical or chemical properties of the article.

BRIEF DESCRIPTION OF THE INVENTION

It has been found that the objectives described can be achieved when the TPO composition is formulated to contain 2-20 percent and preferably 4-15 percent by weight of an oxidized or carboxylated polyolefin, preferably an oxidized polyethylene.

It is preferable to substitute the desired amount of oxidized polyethylene for polypropylene in the composition, but the desired results will be experienced when the carboxylated polyethylene or oxidized polyethylene is present in the described amounts whether substituted for the polypropylene or the EPDM or both in the TPO composition.

DETAILED DESCRIPTION OF THE INVENTION

As previously pointed out, one of the principal components of the TPO composition of which the articles are molded or otherwise fabricated comprises a thermoplastic polyolefin resin which is a homopolymer or copolymer of one or more $C_2$-$C_{10}$ mono-olefins such as polyethylene and preferably polypropylene, which are polymers well known to the trade and readily commercially available, or mixtures thereof. Generally such thermoplastic polyolefin resin is present in the TPO composition in an amount of up to 75 percent by weight of rubber plus resin, and preferably in an amount within the range of 30-70 percent by weight of the composition. When the resin is present in an amount greater than 70 percent by weight of the composition, the composition behaves more like an impact modified thermoplastic than a TPO. It will be apparent to those skilled in the art that such impact modified thermoplastics containing the oxidized polyolefin as an additive would also exhibit improved paint adhesion characteristics. Thus the useful range of compositions includes levels of resin up to 90 parts by weight per 100 parts by weight of the total blend.

The other principal component of the TPO composition is a copolymer of ethylene and a $C_3$-$C_{16}$ mono-olefin, preferably an ethylene-propylene copolymer rubber (EPM) and preferably an interpolymer of (1) ethylene, (2) a $C_3$-$C_{16}$ mono-olefin, preferably propylene and (3) a polyene (EPDM) such as 5-ethylidene-2-norbornene. Such other component is present in the TPO composition in an amount within the range of 30-70 percent by weight and preferably within the range of 40-60 percent by weight.

As the EPM rubber, use can be made of an ethylene-monoolefin and preferably an ethylene-propylene copolymer rubber formed by copolymerization in solvent solution, in the presence of a Ziegler-type catalyst, of ethylene and one or more monoolefins, preferably propylene, but which may include 1-butene, 1-pentene, or other mono-olefins having 3-12 carbon atoms. The ratio of ethylene to propylene or $C_3$-$C_{12}$ mono-olefin may range from 10-95 moles of ethylene to 90-5 moles of propylene or other mono-olefins. The preferred-d range of ethylene to propylene or other mono-olefin is 45-85 moles of ethylene to 55-15 moles of propylene or other mono-olefin.

In the preparation of the EPDM interpolymer rubber, the polyene monomer containing a plurality of carbon-to-carbon double bonds may be selected from those disclosed in the prior art for use as third monomers in the preparation of ethylene-mono-olefin-polyene terpolymers, including open chain polyunsaturated hydrocarbons containing 4-20 carbon atoms, such as 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo(2,2,1)heptane wherein at least one double bond is present in one of the bridged rings, such as dicyclopentadiene, bicyclo(2,1)hepta-2,5-diene, the alkylidene norbornenes, and especially the 5-alkylidene-2-norbornenes wherein the alkylidene group contains 1-20 carbon atoms and preferably 1-8 carbon atoms, the alkenyl norbornenes, and especially the 5-alkenyl-2-norbornenes wherein the alkenyl group contains about 3-20 carbon atoms and preferably 3–10 carbon atoms. Other bridged ring hydrocarbons include polyunsaturated derivatives of bicyclo(2,2,2) octane as represented by bicyclo(3,2,1) octane, polyunsaturated derivatives of bicyclo(3,3,1) nonane, and polyunsaturated derivatives of bicyclo(3,2,2) nonane.

Specific examples of preferred bridged ring compounds include 5-methylene-2-norbornene, 5-ethylidene-2-norbornene, 5-n-propylidene-2-norbornene, 5-isobutylidene-2-norbornene, 5-n-butylidene-2-norbornene, dicyclopentadienes; the methyl butenyl norbornenes such as 5-(2-methyl-2-butenyl)-2-norbornene or 5-(3-methyl-2-butenyl)norbornene, and 5-(3,5-dimethyl-4-hexenyl)-2-norbornene. The elastomer prepared from 5-ethylidene-2-norbornene is much preferred as it has outstanding properties and produces many unusual and unexpected results.

The EPDM backbone rubber may contain chemically bound therein molar ratios of ethylene to propylene or other $C_3$–$C_{16}$ mono-olefin varying between 95:5 to 10:90 ethylene:propylene, and preferably between 85:15 to 55:45 ethylene:propylene. The polyene or substituted polyene may be chemically bound therein in an amount of 0.1 to 10 mol percent, and preferably 0.3 to 1 mol percent. The level of unsaturation in the backbone rubber may range for 0–15 double bonds per 1,000 carbon atoms in the polymer chain.

The interpolymerization is carried out in the presence of a Ziegler catalyst of the type well known to the prior art. Such Ziegler type catalysts are disclosed in a large number of patents, such as U.S. Pat. Nos. 2,933,480, 3,093,620, 3,093,621, 3,211,709 and 3,113,115. Examples of Ziegler catalysts include metal organic coordination catalysts prepared by contacting a compound of a heavy metal of the group IV-a, V-a, VI-a and VII-a of the Mendeleeff periodic system of elements, such as titanium, vanadium and chromium halides with an organo-metallic compound of a metal of groups I, II or III of the Mendeleeff periodic system which contains at least one carbon-metal bond, such as trialkyl aluminum, and alkyl aluminum halides in which the alkyl groups contain from 1–20 and preferably 1–4 carbon atoms.

The preparation of EPM and EPDM polymers is well known and is fully described in such patents as U.S. Pat. Nos. 2,933,480, 3,093,621, 3,211,709, 3,646,168, 3,790,519, 3,884,993, 3,894,999 and 4,059,654, amongst many others.

Oxidized polyethylene wax materials suitable for use in the practice of this invention are described in U.S. Pat. No. 3,060,163. According to this patent normally solid, hard, waxy polymers of ethylene having an average molecular weight between about 1,000 and 3,000 are subjected, in the liquid phase, to the action of an oxygen-containing gas to cause reaction of between 2–17 pounds of oxygen per 100 pounds of wax, i.e. to provide an oxidized polyethylene wax containing at least 1 percent and preferably 1–8 percent by weight of oxygen, and acid numbers of not more than about 50, and preferably between 10 and 45.

In the preferred practice of this invention, the oxidized polyethylene is characterized by having a minimum number average molecular weight above 1000 and preferably at least about 1200, as determined by high temperature vapor pressure osmometry, containing between 1–5 percent by weight of total oxygen, and having an acid number of from 10 to about 35. The described oxidized polyethylene is obtained by oxidation of polyethylene in molten or finely divided solid form, with free oxygen containing gas, usually air, generally at elevated temperature, until the desired oxygen content is obtained. Starting materials for making the oxidized polyethylene suitable for use in the practice of this invention include low molecular weight, low density or linear low density polyethylene waxes having densities in the range of about 0.91 to about 0.96 as, for example, prepared by the process described in U.S. Pat. No. 2,683,141, as well as high density, linear polyethylene as, for example, prepared in the presence of such well know catalysts as the "Phillips" or "Ziegler" type catalysts, having densities in the range of about 0.93–0.97 or above. The low molecular weight, low density polyethylene starting material can be oxidized by contacting in the molten state with a stream of air until the desired oxygen content has been obtained. The high density, linear polyethylene starting material is usually oxidized by contact, preferably in the finely divided solid state, with free oxygen-containing gas, usually air, at temperatures ranging from 100° C. up to, but not including, the crystalline melting point of the polyethylene, until the desired oxygen content has been obtained.

A preferred low molecular weight, low density oxidized polyethylene is marketed by Allied Chemical Corporation under the designation AC-629. This oxidized polyethylene product has a specific gravity of about 0.9±0.05, a number average molecular weight of about 1300, an oxygen content of between 3 and 5, and an acid number of about 14 to 17.

Carboxylated polyethylenes which may be employed in the practice of this invention can be prepared by thermal degradation of a high molecular weight polyethylene in the presence of air or other oxygen-containing gas at an elevated temperature, so as to reduce the molecular weight and introduce carboxylic acid groups at the points of chain scisson. Polyethylene having a molecular weight from about 100,000 to 1,000,000, and a specific gravity of 0.91 to about 0.965 may advantageously be used. For example, a polyethylene having a specific gravity of 0.94, a particle size of 100 mesh (150μ and an original viscosity average molecular weight of $2.6 \times 10^6$ was stirred constantly and heated to 260° F. An air stream heated to 230° F. was passed through the particles. After 13 hours the molecular weight was reduced to about 500,000 and to 60,000 after 16 hours. Ordinarily, carboxylic acid groups are introduced at each point of chain scisson, such that each molecule will have at least one carboxylic acid group, and preferably two such groups at low molecular weight An alternative method for the preparation of a carboxylated polyolefin is by reaction with a polycarboxylic acid, such as maleic, at high temperature. One method of preparation of such materials is described in U.S. Pat. No. 2,766,214.

Having described the basic concepts of this invention and the components thereof, description of the invention will now be made by way of the following examples, which are given by way of illustration and not by way of limitation.

The components which are formed into a composition for fabrication into various products, as by way of conventional molding procedure, are admixed for bulk reaction at a temperature above the melting point temperature of the thermoplastic resinous component, such as at a temperature above 325° F. up to a temperature of 600° F. and preferably up to about 500° F., as in hot melt processing equipment, such as a Banbury or extruder, for from 3–5 minutes.

The procedure for applying the color coating to articles fabricated from the compositions of this invention was carried out as follows:

1. The surface of the fabricated product was first cleaned with an acidic or alkali wash.
2. A Durethane 400 602-1060 primer was applied in an amount to provide a dry film of 1.0±0.2 mils.
3. A second coating of primer was applied after a two minute flash of first coat under ultra-violet light (UV).
4. The second coating was baked under ultra violet for 15–20 minutes at 250° F.
5. A Durethane 700 HSE Topcoat was applied to provide a dry film of 1.8 mils.
6. A second Durethane Topcoat was applied after a 2 minute flash under UV.
7. The second topcoat was baked under UV for at least 20 minutes at 250° F.

A conventional test for adhesion was employed for evaluation of the bond between the topcoat and the surface of the fabricated article. In the adhesion evaluation, referred to in the trade as the "Crosshatch" test, a razor blade is used to cut 11 vertical lines spaced ⅛ inch apart, followed by cross cutting in the same spaced relation to provide 100 squares of ⅛ inch. A pressure sensitive cellophane tape is pressed onto the test area and then it is ripped off. The number of squares which remain bonded to the surface identifies the percent crosshatch. In other words, a value of 100% crosshatch indicates that all of the squares remain bonded to the surface. A 90% crosshatch indicates that 10% of the squares were removed with the tape. A value of 0% crosshatch indicates that all of the squares were removed with the tape and that none remained on the surface of the test piece.

EXAMPLE 1

A typical TPO compound, yielding 60,000 psi flexure modulus, and characterized by very poor paint adhesion, as exhibited by % crosshatch adhesion, had the following composition:

| | |
|---|---|
| EPDM interpolymer having an ethylene-propylene ratio of 80/20 and about 5 C=C double bonds per 1000 carbon atoms (EPsyn ® 5508 of Copolymer Rubber & Chemical Corporation of Baton Rouge, Lousiana) | 50% |
| 12 melt flow polypropylene | 50% |
| Paint adhesion, % crosshatch | 0 |
| Tensile strength, psi | 2750 |
| Elongation, % | 775 |
| Flow Rate g/10 min (Condition "L") | 2.0 |

EXAMPLE 2

Use is made of the typical TPO compound (same as in Example 1) but in which 10 parts by weight of the polypropylene has been replaced with 10 parts by weight of oxidized polyethylene:

| | By Weight |
|---|---|
| EPsyn ® 5508 | 50% |
| 12 melt flow polypropylene | 40% |
| Allied AC oxidized polyethylene | 10% |
| Paint adhesion, % crosshatch | 100 |
| Tensile strength, psi | 3000 |
| Elongation, % | 1100 |
| Flow Rate g/10 min. (condition "L") | 2.8 |

It will be seen from the above, that not only is paint adhesion excellent, but that tensile strength, elongation and flow rate are also improved.

EXAMPLE 3

This example illustrates a typical TPO compound (same as in Example 1) but in which 10 parts by weight of the polypropylene has been replaced with 10 parts by weight of the polyethylene which has not been oxidized:

| | By Weight |
|---|---|
| EPsyn ® 5508 | 50% |
| 12 melt flow polypropylene | 40% |
| Allied AC-617A non-oxidized polyethylene | 10% |
| Paint adhesion, % crosshatch | 0 |
| Tensile strength, psi | 2200 |
| Elongation, % | 650 |
| Flow rate g/10 min. (condition "L") | 3.6 |

It will be noted that in the presence of non-oxidized polyethylene the adhesion is poor. Before the discovery of the instant invention this deficiency was overcome by the incorporation of an additional pretreatment step, prior to the application of the topcoat, involving the treatment of the object to be coated with an adhesion promoter. This step is now made unnecessary by the practice of the instant invention.

EXAMPLES 4–8

The following examples illustrate the effect of the level of added oxidized polyethylene on the paint adhesion properties.

| Formulation (parts by weight) | Examples | | | | |
|---|---|---|---|---|---|
| | 4 | 5 | 6 | 7 | 8 |
| EPsyn ® 5508 | 50 | 50 | 50 | 50 | 50 |
| 12 MF polypropylene | 48 | 46 | 44 | 42 | 40 |
| N550 Black | .5 | .5 | .5 | .5 | .5 |
| Oxidized polyethylene | 2 | 4 | 6 | 8 | 10 |
| Paint adhesion, % crosshatch | 0 | 10 | 100 | 100 | 100 |

It can be seen from the above examples that crosshatch adhesion increases with increasing levels of oxidized polyethylene, reaching the maximum level of 100% adhesion at a level of 6 parts by weight per 100 parts by weight of rubber plus resin plus oxidized polyethylene.

EXAMPLES 9–14

The following examples illustrate the effect of the rubber/resin ratio on the paint adhesion properties at a constant level of oxidized polyethylene.

| Formulation | Examples | | | | | |
| --- | --- | --- | --- | --- | --- | --- |
| (parts by weight) | 9 | 10 | 11 | 12 | 13 | 14 |
| EPsyn ® 5508 | 0 | 10 | 20 | 30 | 40 | 50 |
| 12 MF polypropylene | 90 | 80 | 70 | 60 | 50 | 50 |
| N550 Black | .5 | .5 | .5 | .5 | .5 | .5 |
| Oxidized polyethylene | 10 | 10 | 10 | 10 | 10 | 10 |
| Paint adhesion, % crosshatch | 0 | 25 | 68 | 92 | 100 | 100 |

It can be seen from the above examples that crosshatch adhesion increases with increasing rubber level, reaching the maximum value of 100% at a level of 40 parts by weight of rubber per 100 parts by weight of rubber plus resin plus oxidized polyethylene. This implies that higher levels of oxidized polyethylene are needed to achieve maximum paint adhesion as the level of polypropylene in the blend is increased. This is further supported by Example 15 which demonstrates in comparison with Example 12 that increased oxidized polyethylene raises the crosshatch adhesion for a given level of polypropylene.

EXAMPLE 15

| Formulation | Parts by Weight |
| --- | --- |
| EPsyn ® 5508 | 25 |
| 12 MI Polypropylene | 60 |
| N550 Black | 0.5 |
| Oxidized Polyethylene | 15 |
| Paint adhesion, % crosshatch | 100 |
| Tensile strength, psi | 3300 |
| Elongation, % | 100 |
| Flow Rate (Condition "L"), g/10 min. | 7.6 |

It will be apparent that color coating adhesion is increased when the TPO is formulated to contain 4–15 percent by weight oxidized polyethylene Similar improvements in adhesion are realized when the oxidized polyethylene in the foregoing examples are replaced in whole or in part by oxidized or carboxylated polyethylenes such as isotactic, amorphous, high density and low density polyethylenes and other alpha olefin polymers and copolymers.

It is further assumed that the benefit derived from incorporation of the oxidized polyethylene will be realized whether the compositions are simple blends or contain partially or fully cured rubber as well as oils, fibers, fillers or other additives which are well-known to those skilled in the art.

It will be understood that changes may be made in the details of formulation and operation, without departing from the spirit of the invention, especially as defined by the following claims.

We claim:

1. A fabricated plastic article having a surface which provides an improved bonding relationship with a paint coating in which the article is fabricated of a composition consisting essentially of a substantially uniform admixture of 30–75 parts by weight of thermoplastic polypropylene resin, 70–25 parts by weight of a polymer selected from the group consisting of (a) a copolymer of ethylene and a $C_3$–$C_{16}$ mono-olefin, (b) an interpolymer of ethylene, a $C_3$–$C_{12}$ mono-olefin and a polyene, and (c) 4–15 parts by weight of an oxidized or carboxylated polyethylene.

2. An article as claimed in claim 1 in which the polymer is an EPM copolymer of ethylene and propylene.

3. An article as claimed in claim 2 in which the ethylene and propylene are copolymerized in the ratio of 10–95 moles ethylene to 90–5 moles propylene.

4. An article as claimed in claim 1 in which the said polymer is an interpolymer of ethylene, propylene and 5-ethylidene-2-norbornene.

5. An article as claimed in claim 1 in which the said polymer is an interpolymer in which the polyene is present in an amount within the range of 2–20 $C{=}C$ groups per 1000 carbon atoms.

6. An article as claimed in claim 1 in which the oxidized polyethylene is present in the amount of 4–15 parts by weight.

7. An article as claimed in claim 1 in which said polymer and the thermoplastic polypropylene resin are present in the ratio of 30–70 parts by weight of the polymer to 70–30 parts by weight of the thermoplastic polypropylene resin.

8. An article as claimed in claim 2 in which the ethylene and propylene are copolymerized in the ratio of 60–90 moles ethylene per 10–40 moles propylene.

9. A composition for use in the molding of articles formulated to provide an improved bonding relationship with applied organic coatings consisting essentially of a substantially uniform admixture of 30–75 parts by weight of thermoplastic polypropylene resin, 70–25 parts by weight of a polymer selected from the group consisting of (a) a copolymer of ethylene and a $C_3$–$C_{16}$ mono-olefin, (b) an interpolymer of ethylene, a $C_3$–$C_{12}$ mono-olefin and a polyene, and (c) 4–15 parts by weight of an oxidized or carboxylated polyethylene.

10. A composition as defined in claim 9 in which said polymer is an EPM copolymer of ethylene and propylene.

11. A composition as claimed in claim 9 wherein said polymer is an interpolymer of ethylene, propylene and 5-ethylidene-2-norbornene.

12. A composition as claimed in claim 10 in which the ethylene and propylene are copolymerized in the ratio of 10–95 moles ethylene to 90–5 moles propylene.

13. A composition as claimed in claim 9 in which the said polymer is an interpolymer of ethylene, propylene and 5-ethylidene-2-norbornene.

14. A composition as claimed in claim 9 in which said polymer is an interpolymer in which the polyene is present in an amount with the range of 2–20 $C{=}C$ groups per 1000 carbon atoms.

15. A composition as claimed in claim 9 in which the oxidized polyethylene is present in the amount of 4–15 parts by weight.

16. A composition as claimed in claim 9 in which said polymer and thermoplastic polypropylene resin are present in the ratio of 30–70 parts by weight of the polymer to 70–30 parts by weight of the thermoplastic polypropylene resin.

17. A composition as claimed in claim 10 in which the ethylene and propylene are copolymerized in the ratio of 60–90 moles ethylene per 10–40 moles propylene.

* * * * *